United States Patent
Piccin

(10) Patent No.: US 11,264,819 B1
(45) Date of Patent: Mar. 1, 2022

(54) ILLUMINATED WIRELESS CHARGING AREA FOR A VEHICLE INTERIOR PANEL

(71) Applicant: Faurecia Interior Systems, Inc., Auburn Hills, MI (US)

(72) Inventor: Hugo Piccin, Cupertino, CA (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 31 days.

(21) Appl. No.: 16/996,578

(22) Filed: Aug. 18, 2020

(51) Int. Cl.
| | | |
|---|---|---|
| *H02J 7/00* | (2006.01) | |
| *H02J 7/02* | (2016.01) | |
| *H02J 50/90* | (2016.01) | |
| *H02J 50/10* | (2016.01) | |
| *F21V 8/00* | (2006.01) | |
| *B60R 16/03* | (2006.01) | |
| *B60R 13/02* | (2006.01) | |
| *B60Q 3/70* | (2017.01) | |
| *B60Q 3/54* | (2017.01) | |
| *B60Q 3/20* | (2017.01) | |

(52) U.S. Cl.
CPC ............ *H02J 7/0047* (2013.01); *B60Q 3/20* (2017.02); *B60Q 3/54* (2017.02); *B60Q 3/70* (2017.02); *B60R 13/02* (2013.01); *B60R 16/03* (2013.01); *G02B 6/001* (2013.01); *H02J 7/02* (2013.01); *H02J 50/10* (2016.02); *H02J 50/90* (2016.02); *B60Q 2500/10* (2013.01)

(58) Field of Classification Search
CPC .. H02J 7/0047; H02J 7/02; H02J 50/90; H02J 50/10; B60Q 3/54; B60Q 3/20; B60Q 3/70; B60Q 2500/10; B60R 13/02; B60R 16/03; G02B 6/001

USPC .................................. 362/511, 488; 320/108
See application file for complete search history.

(56) References Cited

U.S. PATENT DOCUMENTS

| | | | |
|---|---|---|---|
| 10,072,947 B1 * | 9/2018 | Mantier | H02J 50/90 |
| 2008/0258679 A1 | 10/2008 | Manico et al. | |
| 2013/0257363 A1 * | 10/2013 | Lota | H02J 7/0047 |
| | | | 320/108 |
| 2014/0203770 A1 | 7/2014 | Salter et al. | |
| 2016/0013679 A1 * | 1/2016 | Jeon | H02J 50/80 |
| | | | 320/108 |
| 2017/0246989 A1 * | 8/2017 | Ben Abdelaziz | B60Q 3/225 |
| 2018/0351403 A1 * | 12/2018 | Yang | H02J 5/005 |
| 2019/0020226 A1 * | 1/2019 | Huang | H02J 7/0042 |
| 2019/0135199 A1 | 5/2019 | Galan Garcia et al. | |

FOREIGN PATENT DOCUMENTS

| | | |
|---|---|---|
| DE | 102014019439 A1 | 6/2016 |
| WO | WO2014110323 A1 | 7/2014 |
| WO | WO2018013557 A1 | 1/2018 |

* cited by examiner

*Primary Examiner* — Laura K Tso
(74) *Attorney, Agent, or Firm* — Reising Ethington P.C.

(57) ABSTRACT

A vehicle interior panel includes a decorative layer having a decorative side, a sensor, a wireless charger, and a light source. The sensor is configured to detect a mobile device situated on the decorative side of the decorative layer, and the wireless charger is configured to create a wireless charging area on the decorative side of the decorative panel. The light source is configured to display a trace sequence that is located between the mobile device and the wireless charging area to help a user locate the wireless charging area.

15 Claims, 5 Drawing Sheets

ILLUMINATED WIRELESS CHARGING AREA FOR A VEHICLE INTERIOR PANEL

TECHNICAL FIELD

The present disclosure is related generally to vehicle interiors and, more particularly, to built-in wireless charging areas for vehicle interior panels.

BACKGROUND

Wireless charging areas can be integrated into vehicle interior panels to provide easily accessible charging for a user's mobile device. US Patent Application Publication 2014/0203770 to Salter et al. is directed to a wireless charging system for a vehicle that detects a charging status of the mobile device and illuminates one or more light sources depending on the charge status. Misalignment of the mobile device with respect to the wireless charging area can be determined, and the wireless charging area can be illuminated. However, this reference does not contemplate a more intuitive illumination scheme to help a user more easily guide a mobile device from outside of the wireless charging area to the wireless charging area.

SUMMARY

An illustrative vehicle interior panel includes a decorative layer having a decorative side, a sensor configured to detect a mobile device situated on the decorative side of the decorative layer, a wireless charger configured to create a wireless charging area on the decorative side of the decorative layer, and a light source configured to display a trace sequence that is located between the mobile device and the wireless charging area.

In various embodiments, the trace sequence is a variable intensity grid pattern.

In various embodiments, the light source is an optical fiber mesh or two optical fiber sheets laid over each other to form a grid of optical fibers.

In various embodiments, the variable intensity grid pattern includes a brightest cross-point near the wireless charging area and a dimmest cross-point at a start of the trace sequence.

In various embodiments, the trace sequence is a series of illuminated dots.

In various embodiments, the series of illuminated dots flash progressively toward the wireless charging area.

In various embodiments, the light source is configured to display a confirmatory indicium when the mobile device is placed at the wireless charging area.

In various embodiments, the decorative layer includes a light transmissive wood layer.

In various embodiments, the decorative layer includes a perforated surface having a plurality of perforations and the plurality of perforations are non-visible from the decorative side.

In various embodiments, the sensor is a force sensing foil that is larger in area than the wireless charging area.

In various embodiments, light source is an optical fiber mesh and the optical fiber mesh is located between the decorative layer and the force sensing foil.

In various embodiments, the force sensing foil is light transmissive.

In various embodiments, the force sensing foil is located between the decorative layer and a light transmissive carrier.

In various embodiments, the light source is a screen that at least partially surrounds the wireless charger.

In various embodiments, the light source includes one or more light emitting diodes (LEDs) that at least partially surround the wireless charger.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle interior panel that includes an integrated wireless charging system that illuminates a trace sequence to help a user intuitively guide a mobile device from outside a wireless charging area to the wireless charging area. Built-in light sources and force sensing can be used to create a trace sequence between the mobile device and the wireless charging area, thereby providing a charging path that the user can easily follow. The trace sequence is configured to appear when the mobile device is placed on the interior panel remote from the wireless charging area. The trace sequence is illuminated upon detection of the mobile device on the interior panel, and it is located between the detected mobile device and the wireless charging area. The trace sequence can have a variable intensity pattern that helps the user track the intensity change to guide the mobile device across the interior panel to the wireless charging area.

Figure 1:
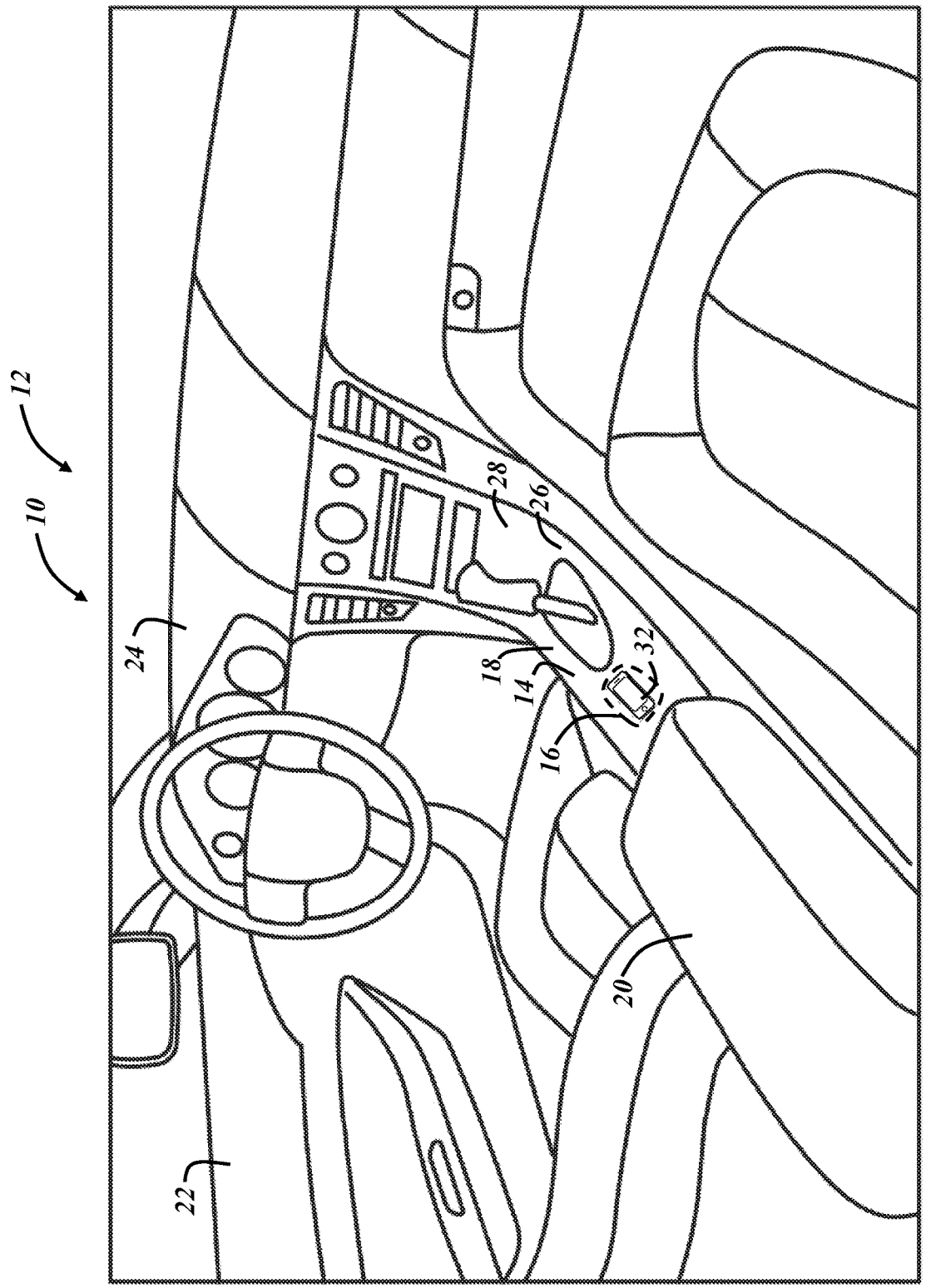
FIG. 1 is a perspective view of the interior of a vehicle passenger cabin showing one example vehicle interior panel with a wireless charging area.

FIG. 1 is a perspective view of an interior of a passenger cabin 10 of a vehicle 12 having an interior panel 14 with a wireless charging area 16. The wireless charging area 16 is illustrated in dotted lines, since in an advantageous embodiment, the wireless charging area 16 is generally invisible (when not backlit) or wholly integrated with the vehicle interior panel 14. This arrangement facilitates wireless charging without impacting the integrity of the décor of the passenger cabin 10. The interior panel 14 in the illustrated embodiment is part of a center console 18. However, other interior panels for vehicle components may be integrated with wireless charging and the illumination schemes described herein, such as one or more panels for the armrest 20, door panel 22, or the instrument panel 24, to cite a few examples.

Figure 2:
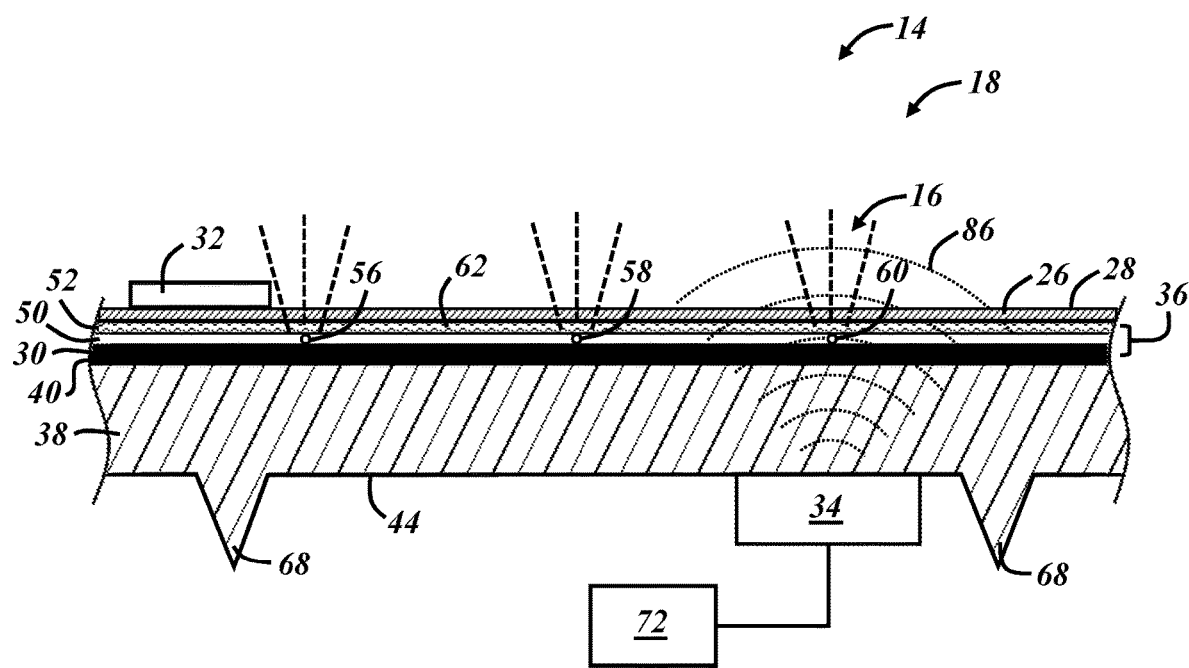
FIG. 2 is a cross-sectional view of a portion of the vehicle interior panel of FIG. 1.

FIG. 2 is a cross-sectional view of a portion of an embodiment of the vehicle interior panel 14. The vehicle interior panel 14 includes a decorative layer 26 having a decorative side 28, a force sensor 30 configured to detect a mobile device 32 situated on the decorative side of the decorative layer, a wireless charger 34 configured to create the wireless charging area 16 on the decorative side of the decorative layer, a light source 36, and a carrier 38. The light source 36 is configured to display a trace sequence that is located between the mobile device 32 and the wireless charging area 16. The trace sequence, detailed further below, provides an intuitive path for the user to follow in order to locate the mobile device 32 at the wireless charging area 16. The mobile device 32 is illustrated in the figures as a phone; however, the mobile device 32 can be any chargeable device situated at or near the decorative side 28 of the interior panel 14. Adhesive or bonding layers can be included between two or more of the various layers or components of the interior panel 14. Further, other layers may be included in addition to those particularly described, such as one or more protective outer layers on the decorative side 28, fabric interlayers, conductive electronic layers, or other functional and/or aesthetic layers.

The decorative layer 26 has a decorative side 28, which is the side of the panel 14 lining the interior of the passenger cabin 10 when installed in the vehicle. The decorative layer 26 is "light-transmissive," meaning that at least some light from the light source 36 is visible to a user in the interior of the passenger cabin 10. Light transmissive may include any non-opaque layer, such as one that is transparent, translucent, semi-transparent, semi-translucent, etc. As detailed below, a light transmissive layer may be made from an opaque material that has a plurality of perforations that facilitate at least some degree of light transmission. In an advantageous embodiment, the decorative layer 26 is a wood veneer layer that is semi-transparent or translucent. The decorative layer 26 can be a single layer, or it may have a multi-layer structure (e.g., a wood sheet complex having a fabric interlayer and one or more protective outer layers). Other materials for the decorative layer are certainly possible, such as fiber-containing resins, leather, or a polymer skin layer, to cite a few examples. When a resin component is included in the decorative layer, it may be colored or tinted for additional contrast or visual interest. The decorative layer 26 may have a thickness in a range from 0.5 mm to 2.5 mm, or preferably from 0.5 mm to 1.5 mm. In one example, the thickness of the decorative layer 26 is between 0.6 mm and 1.0 mm, or about 0.8 mm. Other thickness ranges and configurations are certainly possible. For example, the decorative layer 26 may be thicker in certain regions than others, or it may have a curved or non-planar shape.

A force sensor 30 is included within the interior panel 14 to detect the presence, and in some embodiments, the location, of the mobile device 32. In an advantageous embodiment, the force sensor 30 comprises a pressure sensing foil 40 such as VELOSTAT™. Other force sensors and configurations are possible, such as a series of discrete pressure sensors, one or more capacitive touch sensors, one or more optical position sensors, etc. In one embodiment, conductive sensors are used in a grid pattern such that two connecting wires or lines can be used to indicate the position of applied force. The pressure sensing foil 40 is particularly advantageous, as it can cover a larger area. The pressure sensing should be functionally accessible on the decorative side 28 of the decorative layer 26 in an area larger than the wireless charging area 16. This allows for the formation of a trace sequence 46 between a mobile device 32 situated outside of the wireless charging area 16. In some embodiments, the pressure sensing foil 40 is 3 to 5 times larger in area than the wireless charging area 16. In a particularly advantageous embodiment, the pressure sensing foil 40 is 4 times larger in area than the wireless charging area 16. This size can help provide a sufficiently sized area outside of the wireless charging area 16 for presentation of trace sequence 46. In the embodiment illustrated in FIG. 2, the force sensor 30 can be fully opaque (e.g., not light transmissive), as it is located further from the decorative side 28 of the decorative layer 26 than the light source 36. If the force sensor 30 is light transmissive (e.g., translucent or perforated opaque), it can be located between the decorative layer 26 and the light source 36, as detailed further below.

With pressure sensing foil 40 for the force sensor 30, force thresholds can be set to more precisely detect the center of gravity of the mobile device 32. For example, the pressure sensing foil 40 can capture low forces (e.g., a few Newtons), and the detected pressure may only trigger generation of a trace sequence between the mobile device 32 and the wireless charging area 16 if the detected pressure correlates with a range of likely applied pressures for standard mobile devices.

Wireless charger 34 provides for wireless charging of the mobile device 32. The range of the wireless charger 34 generally defines the size and shape of the wireless charging area 16 on the decorative side 28 of the decorative layer 26 (along with other factors, including but not limited to, the ability of the materials of the panel 14 to allow for the transmission of wireless power). The wireless charger 34 can be an integral component of the panel 14, or it may be separately provided beneath the panel when installed in the vehicle 12, as schematically illustrated in FIG. 2. The wireless charger 34 typically consists of one or more coils 42 (see the schematic representation in FIGS. 3 and 4), and electronics. It may be advantageous to embed the coils 42 into the panel 14 (e.g., into the carrier 38 or in-between layers) so that they are closer to the decorative side 28 of the decorative layer 26. Embedding the coils 42 closer to the decorative side 28 can increase the size of the wireless charging area 16. In the illustrated embodiments, the wireless charger 34, including both the electronics and coils, is bonded or otherwise adhered to a backside 44 of the carrier 38. The wireless charger 34 is powered by a vehicle-based power source and may further include haptic feedback capability, such as a piezoelectric oscillator that causes vibrations to be induced in the panel 14 when triggered by touch, proximity, or other input.

Light source 36 is configured to display a trace sequence 46 (see e.g., FIGS. 3 and 4) that is located between the mobile device 32 and the wireless charging area 16 to help a user intuitively guide the mobile device to the wireless charging area when the mobile device is located wholly outside of the wireless charging area. This is distinguishable from wireless charging areas that only display light to help align the mobile device with the wireless charging area, as the trace sequence can provide a visual cue or indication to a user that is more robust than standard illumination techniques. The light source 36 can be powered by a vehicle-based power source, along with the wireless charger 34. The light source 36 can be any operable light source (e.g., fiber optic, fluorescent or incandescent bulb, light emitting diode (e.g., LED or OLED), etc.), the position of which may be at least partially dictated by the materials in the other layers of the panel 14. The light source 36 may only provide a single light color, or it may provide multiple colors.

Figure 3:
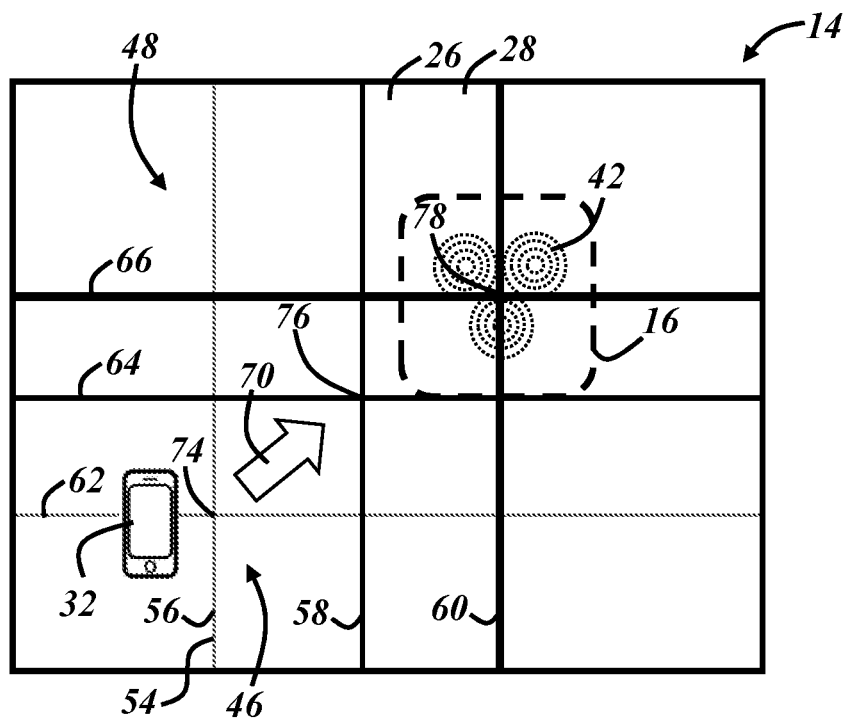
FIG. 3. is a plan view of a portion of a decorative side of the vehicle interior panel of FIGS. 1 and 2, showing a trace sequence to help a user guide the mobile device to the wireless charging area.
Figure 4:
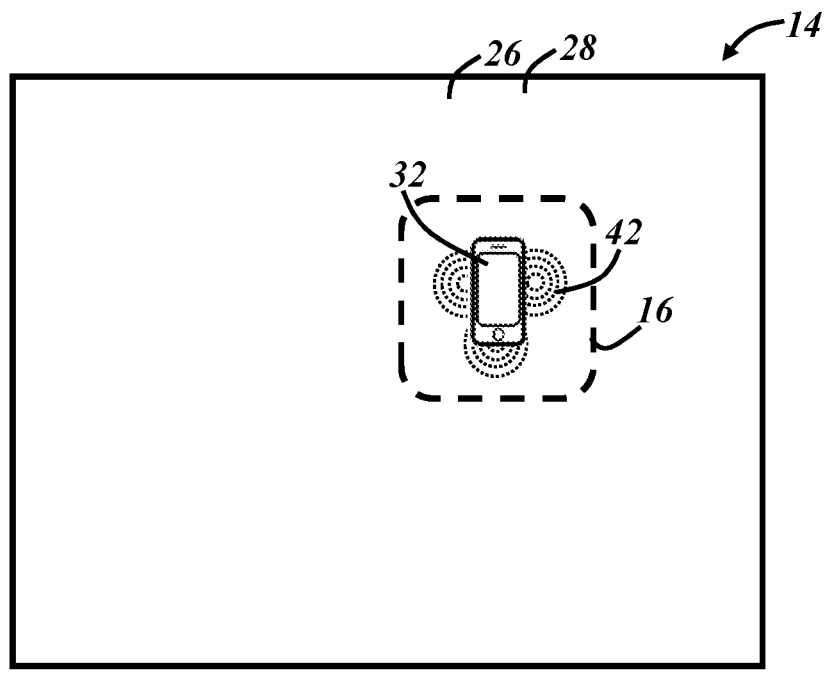
FIG. 4 is a plan view of the portion of the decorative side of the vehicle interior panel with the mobile device at the wireless charging area of FIGS. 1-3.

The light source 36 in the embodiment illustrated in FIGS. 2-4 creates a variable intensity grid pattern 48 for the trace sequence 46. The variable intensity grid pattern 48 is formed from two optical fiber sheets 50, 52 that are overlaid to form a grid 54 of optical fibers 56, 58, 60, 62, 64, 66. In another embodiment, one layer or sheet includes a mesh of optical fibers forming the grid 54. The illustration in FIG. 3 is merely schematic, as there can be more than 3 optical fibers per sheet 50, 52 to form the grid 54. In one particular implementation, the optical fibers are spaced 1 mm apart in an area that is approximately 3-5 times larger than the wireless charging area 16. The area of the force sensing foil 40 can be equal in size or close to equal in size to the area of the grid 54.

Carrier 38 is the physical support layer of the panel 14. The carrier 38 may for example be made from a plastic or plastic-based material. In the embodiment illustrated in FIG. 2, carrier 38 can be made from a fully opaque or non-light-transmissive material, but in other embodiments, such as the embodiment illustrated in FIG. 5, it is advantageous to have the carrier 38 or at least portions of the carrier, be light transmissive. When light transmission is required through the carrier 38, light transmission properties must be balanced with structural properties, some of which depend on the overall size of the panel 14 and on its expected performance. While a perfectly transparent carrier 38 may be desirable in some embodiments, materials such as sheet glass, acrylic, and polycarbonate cannot typically meet the physical performance requirements of a vehicle interior panel, which can be very large (e.g., an instrument panel), must endure severe temperature extremes without changing shape, and must not exhibit brittle fractures in vehicle collision scenarios.

Figure 5:
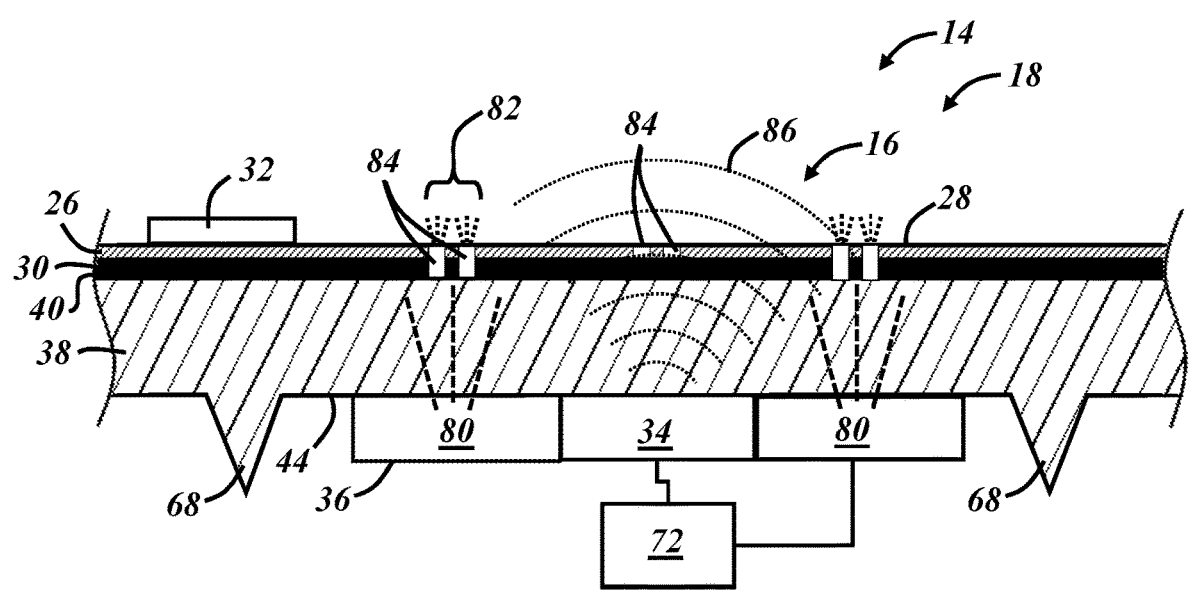
FIG. 5 is a cross-sectional view of a portion of a vehicle interior panel in accordance with another embodiment.

In one embodiment, the carrier 38 is a molded component formed from a translucent glass-fiber reinforced thermoplastic material in which the majority component is a transparent resin such as polycarbonate or acrylic. One suitable carrier material is a glass-fiber reinforced polycarbonate/ABS (PC/ABS) alloy. The glass fibers may be present in an amount between 10-30 wt % or approximately 20 wt %. In applications in which the panel 14 is relatively small and/or vertically oriented, the reinforcing fibers may be omitted to improve the optical clarity of the carrier 38 if desired. In some embodiments, the panel 14 is a relatively small sub-panel of a larger interior panel, in which case, an unreinforced plastic material can be used for the carrier 38. For example, the panel 14 could be made for insertion into the outer side of a larger instrument panel, with the main body of the instrument panel being made from a reinforced plastic material without the requirement of optical clarity. The illustrated carrier 38 also includes reference positioners 68 used to position and fix the carrier and any attached layers or components in a repeatable location during manufacture. The reference positioners 68 illustrated in FIGS. 2 and 5 are but one example of suitable positioners. The thickness of the carrier 38 may be in a range from 0.5 mm to 5.0 mm, or preferably from 1.5 mm to 3.0 mm.

The various components of the panel 14 allow for the formation of a trace sequence 46 on the decorative side 28 of the decorative layer 26. The trace sequence 46 comprises an illuminated pattern, trail, etc. that helps illuminate a path 70 to the wireless charging area 16. The trace sequence 46 starts at or near the mobile device 32 when the mobile device is outside of the wireless charging area 16, and ends at or near the wireless charging area. Accordingly, the trace sequence 46 is located between the mobile device 32 and the wireless charging area 16, but it is possible for one or more portions of the trace sequence 46 to not be located exclusively between the mobile device and the wireless charging area. A controller 72 can be used to calculate the position of the mobile device 32 relative to the set or established wireless charging area 16 and display the trace sequence 46 via the light source 36 accordingly. The controller 72 can comprise a dedicated microcontroller having memory and a processor that is used only for the panel 14. In other embodiments, the controller 72 may be another vehicle controller that also helps carry out other processes in the vehicle (e.g., a body control module or BCM).

The trace sequence 46, in the embodiment illustrated in FIG. 3, is a variable intensity grid pattern 48. The path 70 and the trace sequence 46 is generally defined by grid intersection points 74, 76, 78. However, as described above, it is possible to have more grid intersection points along the trace sequence 46, or in some embodiments, there may be fewer grid intersection points than what is illustrated. In this embodiment, the grid intersection point 74 is the dimmest in terms of light intensity, and the grid intersection point 78 is the brightest in terms of light intensity. Intervening grid intersection points, such as the grid intersection point 76, can have a light intensity between that of the start point 74 and the end point 78 of the trace sequence 46. This light intensity distribution can provide an intuitive path 70 for a user to follow to locate the wireless charging area 16. In the illustrated embodiment, the light intensity of the trace sequence 46 is at least partially correlated with the sensor input from the force sensor 30. A mobile device 32 that is placed further from the wireless charging area 16 (e.g. outside of grid intersection point 74 as illustrated in FIG. 3) will have a larger extent of light intensity distribution in the trace sequence 46 than when the mobile device is placed closer to the wireless charging area (e.g., between grid intersection points 74, 76).

In an advantageous embodiment, the trace sequence 46 dynamically varies depending on the position of the mobile device 32. For example, if a user pushes the mobile device 32 from the location illustrated in FIG. 3 toward the wireless charging area 16, illumination in the optical fibers 54, 56 may be turned off once the mobile device passes grid intersection point 74. Similarly, once the mobile device 32 passes the grid intersection point 76, illumination in the optical fibers 58, 64 can be turned off. This shortens a length of the trace sequence 46 as the position of the mobile device 32 changes across the decorative side 28 of the decorative layer 26. Moreover, the overall light intensity distribution (i.e., the difference between the lowest intensity at the start point 74 of the trace sequence 46 and the highest intensity at the end point 78 of the trace sequence) decreases as the mobile device 32 gets closer to the wireless charging area 16. Similarly, the overall light intensity distribution can increase if the mobile device 32 gets farther from the wireless charging area 16, and in turn, a length of the trace sequence 46 increases. This increase in the overall light intensity distribution of the trace sequence 46 can help guide a user back toward the path 70 to the wireless chagrining area 16.

Figure 6:
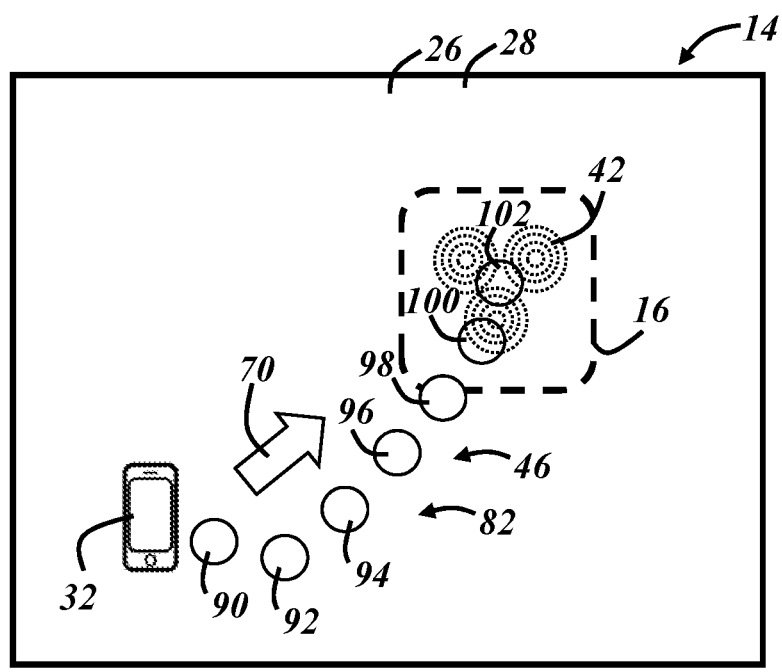
FIG. 6 is a plan view of the portion of the decorative side of the vehicle interior panel of FIG. 5, showing another embodiment of a trace sequence to help a user guide the mobile device to the wireless charging area.
Figure 7:
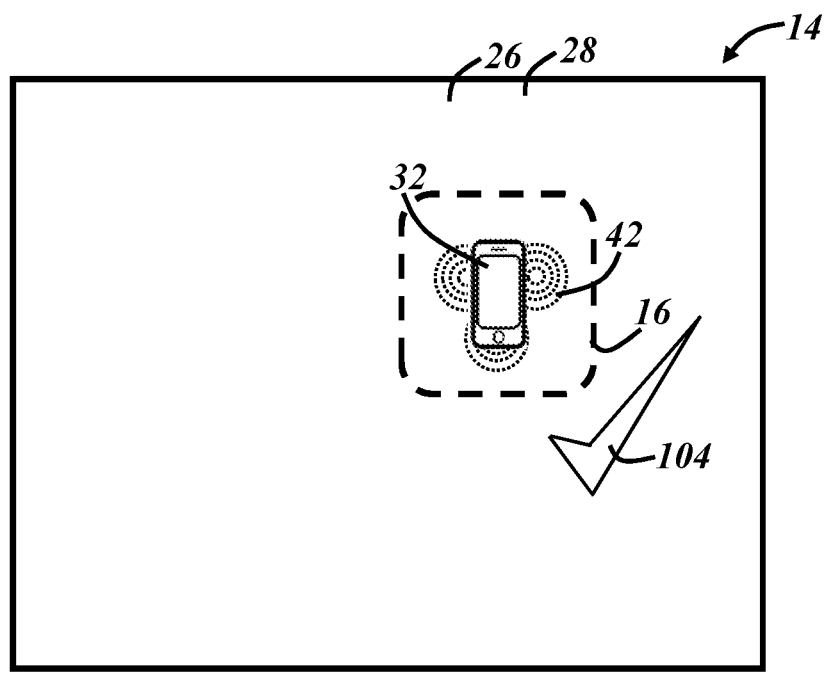
FIG. 7 is a plan view of the portion of the decorative side of the vehicle interior panel with the mobile device at the wireless charging area of FIGS. 5 and 6.

FIGS. 5-7 illustrate another embodiment of the panel 14. In this embodiment, the light source 36 comprises an LED screen 80 that at least partially surrounds the wireless charger 34. The LED screen 80 is mounted, via an adhesive layer or some other method of attachment, to the backside 44 of the carrier 38. Given that there are more intervening layers in the panel 14 between the light source 36 and the decorative layer 26 in this embodiment, further adaptations can be made to improve light transmission through the panel. However, it is possible to reconfigure the layers when using an LED screen or some other light source such that the light source is located at a different position with respect to the decorative layer 26 than those particularly illustrated herein.

In the embodiment of FIGS. 5-7, a pattern 82 of perforations 84 has been formed at least partially through the panel 14 to help facilitate light transmission through one or more of the various layers. The perforations 84 may have a diameter or width in a range from 10 μm to 70 μm, extending entirely through the decorative layer 26 and/or the pressure sensing foil 40. In some embodiments, depending on the desired degree of light transmission, the perforations 84 may extend only partially through the decorative layer 26 and/or the pressure sensing foil 40. If one or more adhesive layers are included in the panel 14, perforations may also be formed in the adhesive layers, which allows the adhesive layer(s) to be formed from an optically opaque material, offering a larger selection of adhesives. As shown in FIG. 5, the perforations 84 may also extend only through the decorative layer 26 and not through the pressure sensing foil 40. It is also possible to extend the perforations 84 partly or entirely through the carrier 38.

The reference positioners 68 are useful in a perforation process to provide an accurate datum from which to locate each individual perforation 84. The perforations 84 can be formed via laser or any other suitable means of selective removal of the decorative layer 26. In one embodiment, an ultraviolet laser is used to form the perforations 84 in the desired pattern 82 along the decorative layer 26. In a particular embodiment, a 3W hybrid fiber optic/WVO$_4$ crystal oscillator laser is used to form the perforations 84. In another embodiment, the perforations 84 are formed through the decorative layer 26 prior to attachment over the carrier 38. In that case, the perforations 84 may be filled with a resin material after formation to prevent the perforations from collecting debris during storage and transport from the perforating operation, particularly when the panel 14 is a backlit panel.

The perforations 84 in the decorative layer 26 permit the wireless charger 34 to transmit or receive a wireless signal 86 through the panel 14, which, depending on the material composition, the decorative layer 26 could otherwise block. As such, the decorative layer 26 may include perforations 84 along only a portion of the panel 14 corresponding to the location of the underlying wireless charger 34 and/or corresponding to the location of the underlying light source 36.

In some embodiments, the perforations 84 may be sized such that they are non-visible from the decorative side 28 of the panel 14. More particularly, the perforations 84 can be made non-visible in the absence of backlighting. As used herein, "non-visible" means not visibly detectable from a distance of 0.5 meters in normal daylight conditions by a person with 20/20 vision in the passenger cabin of the vehicle in which the panel is installed.

The size of the perforations 84 may be in a range from 10 μm to 70 μm. Whether the perforations 84 are non-visible may depend on factors other than their size. For example, perforations having a diameter or width of 10 μm may be non-visible under almost any condition and in almost any material. But perforations 84 having a diameter or width of 50 μm may be visible in a smooth decorative layer 26 (e.g., a metal film or a high resin-content carbon fiber product) while remaining substantially non-visible in a more three-dimensional decorative layer, such as a woven carbon fiber layer. Other factors such as color or reflectivity of the decorative layer 26, diffusivity of a protective layer, inter-perforation spacing, or the regularity of any pattern of perforations may also play a role in their visibility. Other factors such as process time must also be considered. For example, while smaller perforations 84 may naturally be less visible, the number of perforations required may increase to achieve the same transparency to the wireless signal 86, which can increase the time required to make the perforations.

The perforations 84 may be arranged in a pattern 82 such that an illuminated pattern 82 corresponding to the trace sequence 46 appears at the decorative side 28 of the panel 14 when the panel is backlit. The pattern 82 is any non-random arrangement of the perforations 84 along the decorative layer 26. In the illustrated example the pattern 82 and the trace sequence 46 are in the form of a series 88 of dots 90, 92, 94, 96, 98, 100, 102. The illuminated pattern 84 and trace sequence 46 may be any sort of symbol, such as an alpha-numeric character, a geometric shape, an icon, or any other non-random shape intended to visually communicate information to a user. Other non-random arrangements are possible, such as a repeating stripe pattern, or some other pattern that helps a user locate the wireless charging area 16.

The perforations 84 are discrete, and the spacing between adjacent perforations 84 of the pattern 82 may have an effect on the appearance of the illuminated trace sequence 46. For instance, the perforations 84 may be spaced sufficiently close together so that the illuminated pattern 82 is continuous—i.e., such that the presence of discrete underlying perforations is not discernible. In other examples, the perforations 84 may be spaced apart sufficiently to intentionally create a pixelated or digital effect in the illuminated pattern 82 and trace sequence 46.

In one particular example, the perforations 84 are sized in a range from 10 μm to 30 μm, and each perforation 84 is spaced from an adjacent perforation by an amount in a range from 0.4 mm to 0.6 mm. With a partially diffusive protective layer, this arrangement of perforation size and spacing has been observed to provide a non-visible pattern 84 of perforations 82 and to display an illuminated trace sequence 46 in which the individual perforations are not discernible. This perforation size and spacing can also convert the otherwise wireless communication-blocking material of the decorative layer 26 to a layer through which the wireless communication signal 86 can pass.

The trace sequence 46 in the embodiment illustrated in FIG. 6 comprises the series 88 of illuminated dots 90-102. These dots 90-102 generally correspond to the pattern 82 of perforations 84; however, it is possible to form the same pattern with alternative materials or light sources. In an advantageous embodiment, the dots 90-102 flash progressively toward the wireless charging area 16 to provide a visual cue and illuminate a path 70 to the wireless charging area. For example, the controller 72 can illuminate all of the dots 90-102 upon detection of the mobile device 32 with the sensor 30. Then, the controller 72 can selectively de-illuminate and re-illuminate each dot progressively from the start of the trace sequence 46 at dot 90 to the end of the trace sequence 46 at dot 102. As with the embodiment illustrated in FIG. 3, the trace sequence 46 can shorten in length as the mobile device 32 moves closer toward the wireless charging area 16. Also, similar to the FIG. 3 embodiment, instead of progressively flashing, the trace sequence 46 can have a more static presentation, with or without a light intensity distribution (e.g., dot 90 would be the dimmest in intensity and dot 102 would be the brightest).

The dots 90-102 can take any desired shape, and the shape may be at least partially dictated by the pattern 82 of perforations 84. In some embodiments, the trace sequence 46 is comprised of differently shaped dots, or an alternatively shaped design altogether. For example, the trace sequence 46 may comprise one or more lines, arrows, etc. that help indicate the presence of the wireless charging area 16. Any operable shape or design that exists at least partially outside of the wireless charging area 16 can be used for the trace sequence 46.

FIG. 7 shows the mobile device 32 located at the wireless charging area 16 after following the path 70 as indicated by the trace sequence 46 in FIG. 6. In this embodiment, a confirmatory indicium 104 is illuminated once the mobile device 32 reaches the wireless charging area 16. The confirmatory indicium or indicia 104 provides a visual cue to the user that the mobile device 32 is at least partially or wholly within the wireless charging area 16. Presentation of the confirmatory indicia 104 may occur at the same time as the wireless signal 86 is sent out by the wireless charger 34 when the mobile device 32 reaches the wireless charging area 16. In other embodiments, the wireless charger 34 begins to send signal 86 when the trace sequence 46 is presented.

The confirmatory indicium 104 in FIG. 7 is an illuminated checkmark. The checkmark can be a different color than the trace sequence 46 in order to enhance visual differentiation and cue the user to proper placement of the mobile device 32 (e.g., confirmatory indicium 104 is green while the trace sequence 46 is yellow or white). In other embodiments, the confirmatory indicium 104 can take other forms, such as an illuminated box or ring around the wireless charging area 16, to cite one example. In yet other embodiments, the confirmatory indicium 104 can blink or the like until the mobile device 32 is properly located with respect to the wireless charging area 16. At that point, the confirmatory indicium 104 can be statically illuminated upon proper positioning.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A vehicle interior panel, comprising:
a decorative layer having a decorative side;
a sensor configured to detect a mobile device situated on the decorative side of the decorative layer;
a wireless charger configured to create a wireless charging area on the decorative side of the decorative layer; and
a light source configured to display a trace sequence that is located between the mobile device and the wireless charging area.

2. The vehicle interior panel of claim 1, wherein the trace sequence is a variable intensity grid pattern.

3. The vehicle interior panel of claim 2, wherein the light source is an optical fiber mesh or two optical fiber sheets laid over each other to form a grid of optical fibers.

4. The vehicle interior panel of claim 2, wherein the variable intensity grid pattern includes a brightest crosspoint near the wireless charging area and a dimmest crosspoint at a start of the trace sequence.

5. The vehicle interior panel of claim 1, wherein the trace sequence is a series of illuminated dots.

6. The vehicle interior panel of claim 5, wherein the series of illuminated dots flash progressively toward the wireless charging area.

7. The vehicle interior panel of claim 1, wherein the light source is configured to display a confirmatory indicium when the mobile device is placed at the wireless charging area.

8. The vehicle interior panel of claim 1, wherein the decorative layer includes a light transmissive wood layer.

9. The vehicle interior panel of claim 1, wherein the decorative layer includes a perforated surface having a plurality of perforations and the plurality of perforations are non-visible from the decorative side.

10. The vehicle interior panel of claim 1, wherein the sensor is a force sensing foil that is larger in area than the wireless charging area.

11. The vehicle interior panel of claim 10, wherein the light source is an optical fiber mesh and the optical fiber mesh is located between the decorative layer and the force sensing foil.

12. The vehicle interior panel of claim 10, wherein the force sensing foil is light transmissive.

13. The vehicle interior panel of claim 11, wherein the force sensing foil is located between the decorative layer and a light transmissive carrier.

14. The vehicle interior panel of claim 13, wherein the light source is a screen that at least partially surrounds the wireless charger.

15. The vehicle interior panel of claim 13, wherein the light source includes one or more light emitting diodes (LEDs) that at least partially surround the wireless charger.

* * * * *